United States Patent
Gentsch et al.

(10) Patent No.: US 11,342,140 B2
(45) Date of Patent: May 24, 2022

(54) THREE-POSITION DISCONNECTOR SWITCH

(71) Applicant: ABB Schweiz AG, Baden (CH)

(72) Inventors: Dietmar Gentsch, Ratingen (DE); Radek Javora, Hrusovany u Brna (CZ)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/110,332

(22) Filed: Dec. 3, 2020

(65) Prior Publication Data
US 2021/0183597 A1    Jun. 17, 2021

(30) Foreign Application Priority Data

Dec. 11, 2019    (EP) .................................. 19 215 336

(51) Int. Cl.
| | | |
|---|---|---|
| *H01H 9/00* | (2006.01) | |
| *H01H 31/00* | (2006.01) | |
| *H01H 33/02* | (2006.01) | |
| *H01H 33/42* | (2006.01) | |
| *H02B 13/00* | (2006.01) | |

(52) U.S. Cl.
CPC ........ *H01H 31/003* (2013.01); *H01H 9/0072* (2013.01); *H01H 33/022* (2013.01); *H01H 33/42* (2013.01); *H02B 13/00* (2013.01)

(58) Field of Classification Search
CPC .. H01H 31/003; H01H 31/023; H01H 31/026; H01H 31/14; H01H 33/022; H01H 33/42; H01H 9/0072; H01H 1/356; H01H 1/38
USPC ........ 200/82 R; 218/78, 79, 80, 93, 100, 12, 218/67
See application file for complete search history.

(56) References Cited

U.S. PATENT DOCUMENTS 6,559,403 B2 * 5/2003 Gutalj .................. H01H 31/003
                                                                     218/43
7,186,942 B1 * 3/2007 Slade ................. H01H 33/6661
                                                                     218/120

(Continued)

FOREIGN PATENT DOCUMENTS

| DE | 102006053376 A1 | 5/2008 |
|---|---|---|
| WO | WO 2017141060 A1 | 8/2017 |
| WO | WO 2018108990 A1 | 6/2018 |

OTHER PUBLICATIONS

Translation DE102006053376(Original document published May 15, 2008) (Year: 2008).*

*Primary Examiner* — William A Bolton
(74) *Attorney, Agent, or Firm* — Leydig, Voit & Mayer, Ltd.

(57) ABSTRACT

A three-position disconnector switch includes: an earthing contact; a power out contact; a power in contact; a first piston; and a second piston. In a connected switch position the first piston makes an electrical connection with the power out contact and the second piston makes an electrical connection with the power out contact and the power in contact. In a disconnected switch position the first piston makes an electrical connection with the power out contact and the second piston makes an electrical connection with the power out contact. In an earthed switch position the first piston makes an electrical connection with the earthing contact and with the power out contact and the second piston makes an electrical connection with the power out contact.

14 Claims, 4 Drawing Sheets

(56) References Cited

U.S. PATENT DOCUMENTS

| | | | | |
|---|---|---|---|---|
| 8,723,069 B2* | 5/2014 | Jecke | ............... | H01H 31/003 |
| | | | | 218/43 |
| 8,791,379 B2* | 7/2014 | Kikukawa | ............. | H02B 13/01 |
| | | | | 200/5 A |
| 9,190,230 B2* | 11/2015 | Johnson | ............... | H01H 31/003 |
| 9,343,881 B2* | 5/2016 | Hyrenbach | ......... | H02B 13/045 |
| 9,997,313 B2* | 6/2018 | Hu | ..................... | H01H 33/664 |
| 2012/0012449 A1 | 1/2012 | Shin et al. | | |
| 2015/0279603 A1* | 10/2015 | Lang | ................. | H01H 71/025 |
| | | | | 200/293 |
| 2018/0197709 A1 | 7/2018 | Liu | | |

* cited by examiner

THREE-POSITION DISCONNECTOR SWITCH

CROSS-REFERENCE TO PRIOR APPLICATION

Priority is claimed to European Patent Application No. EP 19 215 336.9, filed on Dec. 11, 2019, the entire disclosure of which is hereby incorporated by reference herein.

FIELD

The present invention relates to a three-position disconnector switch.

BACKGROUND

Usual three-position disconnector switch today, require to have a certain length, in order to guarantee proper mechanical functionality as well as to keep necessary dielectric distances between parts of the switch and surroundings during testing and operation.

An associated disadvantage is that a relatively long total length is required to accommodate all the contacts, and to keep a required distance from the surroundings.

There is a need to address this problem.

Therefore, it would be advantageous to have an improved three-position disconnector switch.

SUMMARY

In an embodiment, the present invention provides a three-position disconnector switch, comprising: an earthing contact; a power out contact; a power in contact; a first piston; and a second piston, wherein in a connected switch position the first piston is configured to make an electrical connection with the power out contact and the second piston is configured to make an electrical connection with the power out contact and the power in contact, wherein in a disconnected switch position the first piston is configured to make an electrical connection with the power out contact and the second piston is configured to make an electrical connection with the power out contact, and wherein in an earthed switch position the first piston is configured to make an electrical connection with the earthing contact and with the power out contact and the second piston is configured to make an electrical connection with the power out contact.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
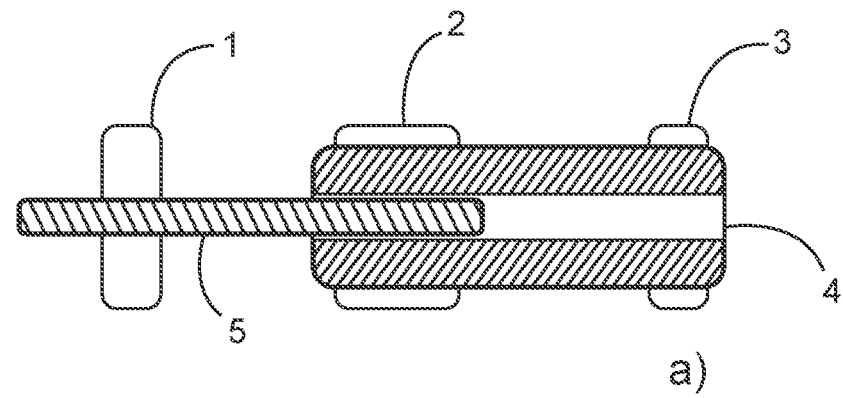
FIG. 1 shows an example of an existing three-position disconnector switch shown in a) connected position, b) disconnected position, c) earthed position.
Figure 1:
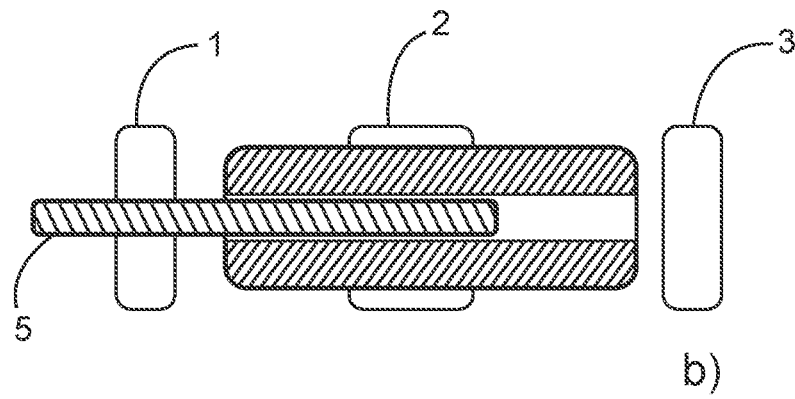
Figure 1:
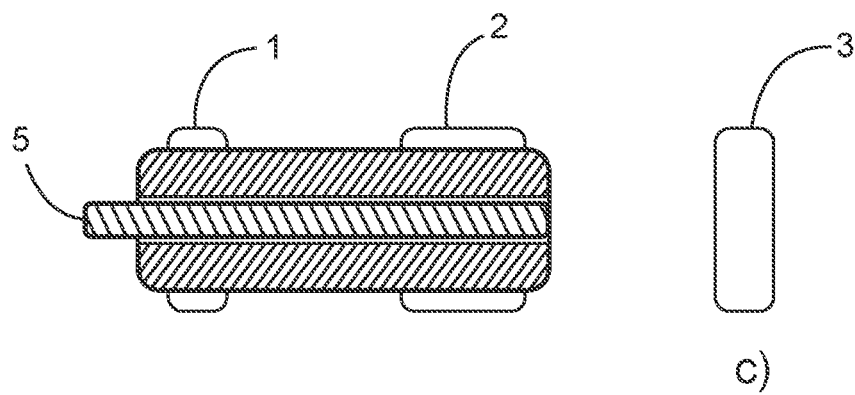

In a first aspect, there is provided a three-position disconnector switch, comprising:
an earthing contact;
a power out contact;
a power in contact;
a first piston; and
a second piston.

In a connected switch position:
The first piston is configured to make an electrical connection with the power out contact and the second piston is configured to make an electrical connection with the power out contact and the power in contact.

In a disconnected switch position:
The first piston is configured to make an electrical connection with the power out contact and the second piston is configured to make an electrical connection with the power out contact.

In an earthed switch position:
The first piston is configured to make an electrical connection with the earthing contact and with the power out contact and the second piston is configured to make an electrical connection with the power out contact.

In an example, in the connected switch position the three-position disconnector switch is configured such that the first piston does not make an electrical connection with the power in contact.

In an example, in the disconnected switch position the three-position disconnector switch is configured such that the first piston does not make an electrical connection with the power in contact.

In an example, in the disconnected switch position the three-position disconnector switch is configured such that the second piston does not make an electrical connection with the earthing contact.

In an example, in the earthed switch position the three-position disconnector switch is configured such that the second piston does not make an electrical connection with the earthing contact.

In an example, in the connected switch position a distance between a first end of the first piston and the power in contact is less than a distance between a second end of the first piston and the earthing contact.

In an example, in the disconnected switch position a distance between the first end of the first piston and the power in contact is less than a distance between the second end of the first piston and the earthing contact.

In an example, the three-position disconnector switch comprises a first insulator part, wherein in the connected switch position and the disconnected switch position the first insulator part is located between the first end of the first piston and the power in contact.

In an example, in the earthing switch position the first insulator part is located between the first end of the first piston and the power in contact.

In an example, in the connected switch position and the disconnected switch position the first end of the first piston is at least partially located within the first insulator part.

In an example, in the disconnected switch position a distance between a first end of the second piston and the power in contact is greater than a distance between a second end of the second piston and the earthing contact or housing wall in electrical contact with the earthing contact.

In an example, in the earthed switch position a distance between the first end of the second piston and the power in contact is greater than a distance between the second end of the second piston and the earthing contact or the housing wall in electrical contact with the earthing contact.

In an example, the three-position disconnector switch comprises a second insulator part, wherein in the disconnected switch position and the earthed switch position the second insulator part is located between the second end of the second piston and the earthing contact.

In an example, in the connected switch position the second insulator part is located between the second end of the second piston and the earthing contact or the housing wall in electrical contact with the earthing contact.

In an example, in the disconnected switch position and the earthed switch position the second end of the second piston is at least partially located within the second insulator part.

In an example, the first piston is configured to move along a first axis and the second piston is configured to move along a second axis, where the first axis is parallel to the second axis and the first axis is spaced laterally to the second axis.

In a second aspect, there is provided a low voltage or medium voltage switchgear or control gear comprising one or more three-position disconnector switches according to the first aspect.

The above aspects and examples will become apparent from and be elucidated with reference to the embodiments described hereinafter.

Figure 2:
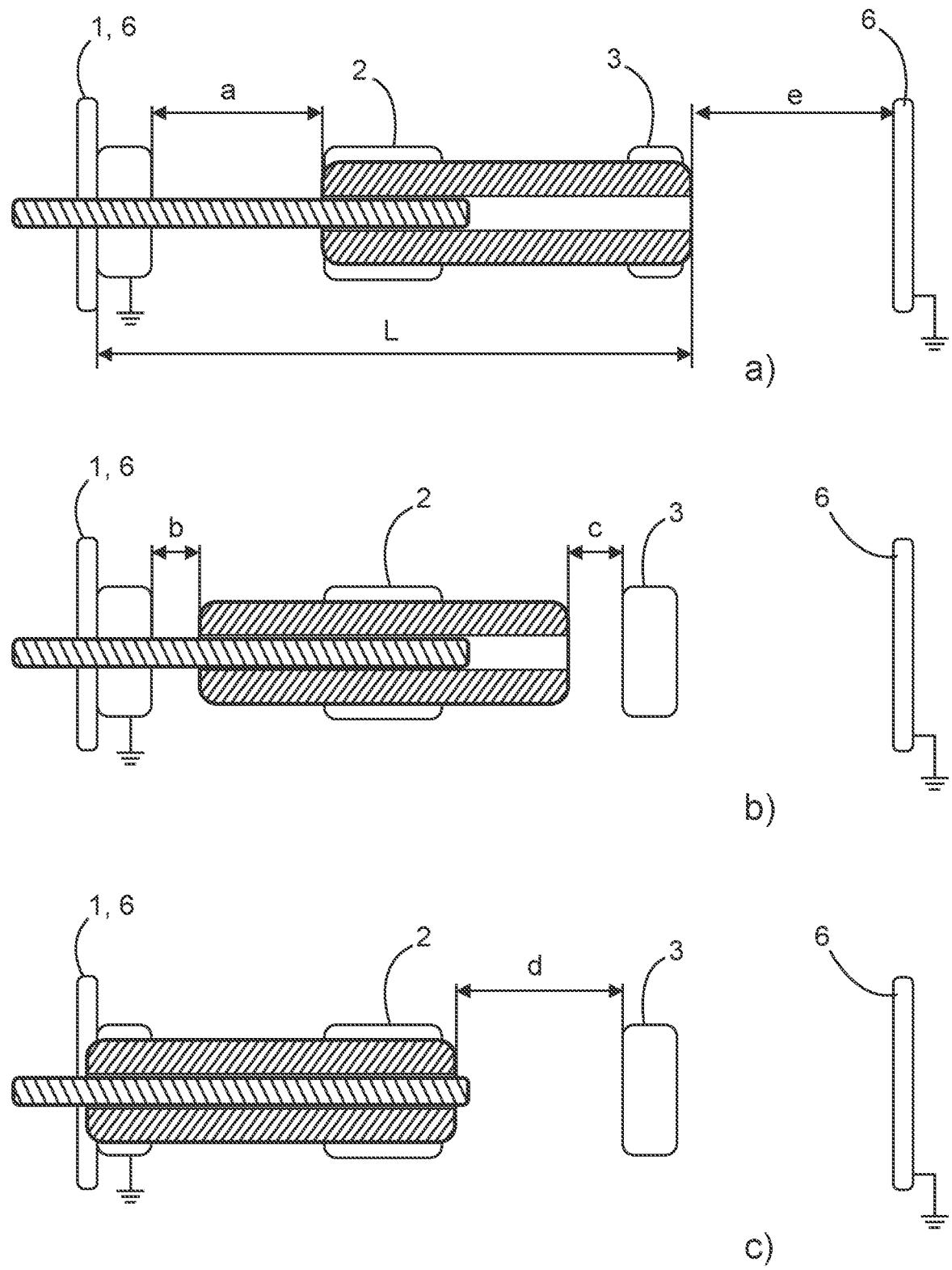
FIG. 2 shows an example of the existing three-position disconnector switch of FIG. 1 shown in a) connected position, b) disconnected position, c) earthed position, where distances between parts of the switch and between the switch and surroundings are shown.
Figure 3:
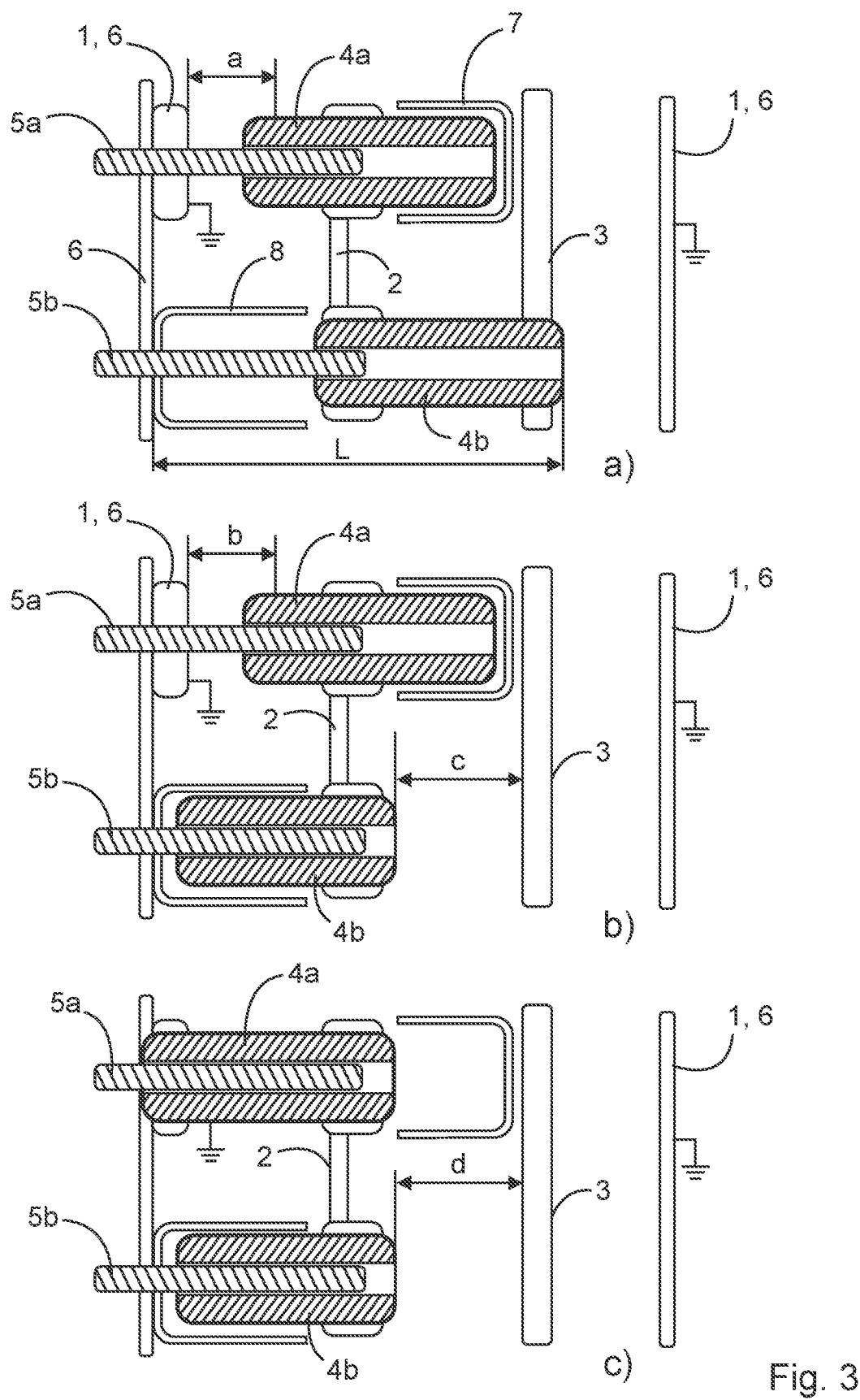
FIG. 3 shows an example of a new three-position disconnector switch shown in a) connected position, b) disconnected position, c) earthed position.

To place the new three-position disconnector switch, shown at FIG. 3, in context it is worthwhile introducing an existing design of three-position disconnector switch, as shown in FIGS. 1-2.

FIG. 1 shows an exemplar design of a three-position disconnector switch, as used in for example medium voltage applications, in for example switchgear or control gear. FIG. 1 shows a schematic cross-section of the design of this conventional linear three-position disconnector switch, where a) shows the connected position, b) shows the disconnected position, and c) shows the earthed position.

In FIG. 1, the following reference numerals indicate the following features:

1 is an earthing contact housing, 2 is a power outgoing contact housing, 3 is a power incoming contact housing, 4 is tube/piston housing, arranged to provide conductive connection of required contacts and 5 is motor operated threaded rod which is used to move and hold the piston in a desired position.

FIG. 2 then illustrates the total length L, required for the design of FIG. 1 and indicating the space occupied by this design. Again FIG. 2 shows a schematic cross-section of the design of this conventional linear three-position disconnector switch, where a) shows the connected position, b) shows the disconnected position, and c) shows the earthed position.

Here, numeral 6 represents for example a wall of the switchgear, or in general any kind of surface with earth potential, and this can be linked to the earthing contact housing. In such design, there needs to be maintained certain clearance distances "a", "b", "c" and "d" between the respective contacts and the end of the piston 4. Distance "a" is the distance between the earthing contact 1 and the first end of the piston 4 when the switch is in the connected position. Distance "e" is the distance between the other second end of the piston 4 and an earthed wall 6 of the switchgear. Distance "b" is the distance between the first end of the piston 4 and the earthing contact 1 when the switch is in the disconnected position, and distance "c" is the associated distance between the second end of the piston 4 and the power in contact 3. Distance "d" is the distance between the second end of the piston 4 and the power in contact 3 when the switch is in the earthed position.

The magnitude of these distances depends on the voltage level at which the disconnector switch is operating and on the environmental conditions surrounding the equipment. In theory, distances "b" and "c" can be of the same length, but actual distances might slightly vary due to other reasons. The distances "b" and "c" are selected in order that all required dielectric are fulfilled with respect to the given voltage levels. Distances "a" and "d" will be bigger than "b" and "c", due to the physical location of the contacts 1, 2 and 3 and due to the rounded edges of the piston 4 needed for smooth sliding/centering into these contacts.

In FIG. 2, the total length of the three-position disconnector switch is indicated as "L". In the connected position (FIG. 2a), the parts of the switch need to be spaced a certain distance "e" from other surrounding grounded parts 6, for example a grounded wall of a switchgear. In the situation when the distances "b" and "c" need to be increased, this has a significant impact on total length "L" of the three-position disconnector switch. This is because in addition to distances "b" and "c" increase, also distances "a" and "b" will be thus increased, as well as the piston 4 itself then needs to be longer. It is to be noted that in general distance "a" is bigger than distance "b" and distance "d" is bigger than distance "c".

A disadvantage of the current three-position switch described with respect to FIGS. 1-2 is that a relatively long total length "L" is required to accommodate all contacts and to keep enough distance from all surrounded parts.

FIG. 3 shows an example of a new three-position disconnector switch design, that addresses this disadvantage. In FIG. 3 a cross-section of the new length-optimized disconnector switch is shown, where a) shows the connected position, b) shows the disconnected position, and c) shows the earthed position.

In an example, the three-position disconnector switch comprises an earthing contact 1, a power out contact 2, a power in contact 3, a first piston 4a, and a second piston 4b.

In a connected switch position: the first piston is configured to make an electrical connection with the power out contact and the second piston is configured to make an electrical connection with the power out contact and the power in contact.

In a disconnected switch position: the first piston is configured to make an electrical connection with the power out contact and the second piston is configured to make an electrical connection with the power out contact.

In an earthed switch position: the first piston is configured to make an electrical connection with the earthing contact and with the power out contact and the second piston is configured to make an electrical connection with the power out contact.

In an example, the three-position switch comprises: a first threaded rod 5a, and a second threaded rod 5b. Rotation of the first threaded rod is configured to engage with the first piston to move the first piston and rotation of the second threaded rod is configured to engage with the second piston to move the second piston.

According to an example, in the connected switch position the three-position disconnector switch is configured such that the first piston does not make an electrical connection with the power in contact.

According to an example, in the disconnected switch position the three-position disconnector switch is configured such that the first piston does not make an electrical connection with the power in contact.

According to an example, in the disconnected switch position the three-position disconnector switch is configured such that the second piston does not make an electrical connection with the earthing contact.

According to an example, in the earthed switch position the three-position disconnector switch is configured such that the second piston does not make an electrical connection with the earthing contact.

According to an example, in the connected switch position a distance between a first end of the first piston and the power in contact is less than a distance between a second end of the first piston and the earthing contact.

According to an example, in the disconnected switch position a distance between the first end of the first piston and the power in contact is less than a distance between the second end of the first piston and the earthing contact.

In an example, in the connected switch position and the disconnected switch position the first end of the first piston is spaced from the power in contact by the same distance.

In an example, in the connected switch position and the disconnected switch position the second end of the first piston is spaced from the earthing contact by the same distance.

The distances a an b can be different, with the above relating only to a specific exemplar embodiment.

Thus in the connected switch position and the disconnected switch position the first end of the first piston can be spaced from the power in contact by different distances.

Also in the connected switch position and the disconnected switch position the second end of the first piston can be spaced from the earthing contact by different distances.

According to an example, the three-position disconnector switch comprises a first insulator part. In the connected switch position, and the disconnected switch position, the first insulator part is located between the first end of the first piston and the power in contact.

According to an example, in the earthing switch position the first insulator part is located between the first end of the first piston and the power in contact.

According to an example, in the connected switch position and the disconnected switch position the first end of the first piston is at least partially located within the first insulator part.

According to an example, in the disconnected switch position a distance between a first end of the second piston and the power in contact is greater than a distance between a second end of the second piston and the earthing contact or housing wall in electrical contact with the earthing contact.

According to an example, in the earthed switch position a distance between the first end of the second piston and the power in contact is greater than a distance between the second end of the second piston and the earthing contact or the housing wall in electrical contact with the earthing contact.

In an example, in the disconnected switch position and the earthed switch position the first end of the second piston is spaced from the power in contact by the same distance.

In an example, in the disconnected switch position and the earthed switch position the second end of the second piston is spaced from the earthing contact or housing wall in electrical contact with the earthing contact by the same distance.

The distances c an d can be different, with the above relating only to a specific exemplar embodiment.

Thus in the disconnected switch position and the earthed switch position the first end of the second piston can be spaced from the power in contact by different distances.

Also in the disconnected switch position and the earthed switch position the second end of the second piston can be spaced from the earthing contact or housing wall in electrical contact with the earthing contact by different distances.

According to an example, the three-position disconnector switch comprises a second insulator part. In the disconnected switch position, and the earthed switch position, the second insulator part is located between the second end of the second piston and the earthing contact or the housing wall in electrical contact with the earthing contact.

According to an example, in the connected switch position the second insulator part is located between the second end of the second piston and the earthing contact or the housing wall in electrical contact with the earthing contact.

According to an example, in the disconnected switch position and the earthed switch position the second end of the second piston is at least partially located within the second insulator part.

According to an example, the first piston is configured to move along a first axis and the second piston is configured to move along a second axis, where the first axis is parallel to the second axis and the first axis is spaced laterally to the second axis. However, these two parts can be located in a horizontal or vertical orientation, and indeed there can be something between the two.

One or more of the new three-position disconnector switches as described with respect to FIG. 3 can be utilized in a low voltage or medium voltage switchgear or control gear.

Continuing with FIG. 3, the new three-position disconnector design provides an improvement/reduction in the length of the switch, making the switch suitable for areas with reduced available space in a longitudinal direction. This is achieved by locating parts of the switch in parallel.

The configuration of the three-position disconnector, as shown in FIG. 3, utilizes insulating caps 7 and 8. Such caps could be made of any electrically non-conductive materials, such as thermoplast or thermoset with low humidity absorption capacity. Cap 7 helps to minimize the distance of the piston 4a to the power incoming contact 3 and cap 8 helps to minimize the distance of the piston 4b to earthed surrounded part 6. In such a design, distance "b" can be the same as distance "a" and distance "c" can be the same as distance "d". Distance "a" is the distance between the earthing contact 1 and the second end of the first piston 4a when the switch is in the connected position, and distance "b" is the associated position when the switch is in the disconnected position. Distance "c" is the distance between the first end of the second piston 4b and the power in contact 3 when the switch is in a disconnected position, and distance "d" is the associated distance when the switch is in the earthed position.

Figure 4:
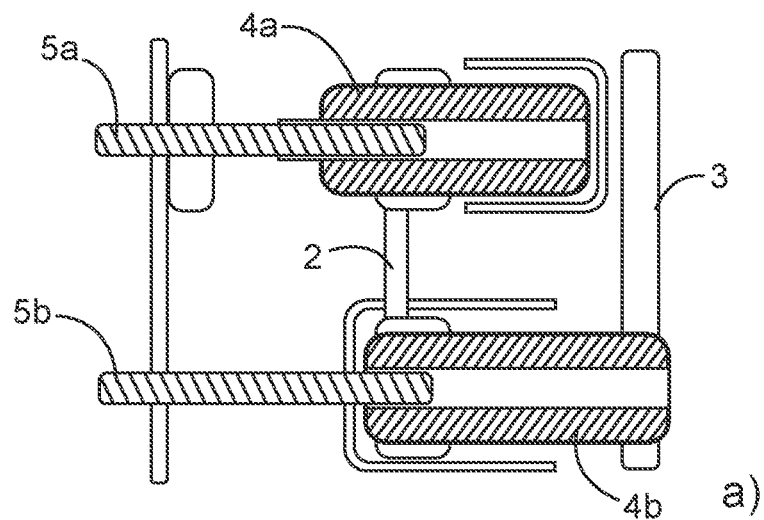
FIG. 4 shows an example of a new three-position disconnector switch shown in a) connected position, b) disconnected position, c) earthed position.
Figure 4:
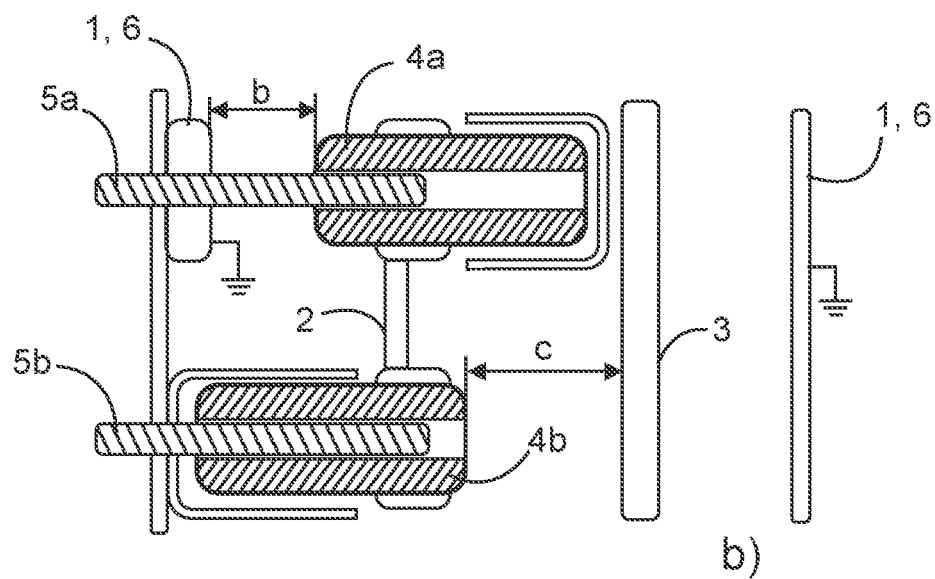
Figure 4:
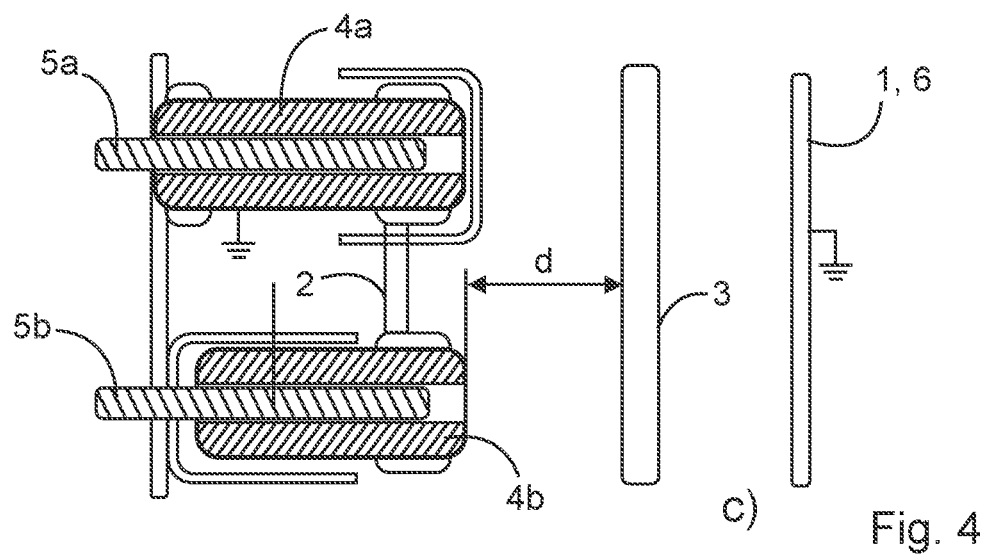

The insulating caps 7 and 8 could be fixed in certain positions and pistons 4a and 4b can move in and out respectively, as described with respect to and shown in FIG. 3, but there could also be a solution where insulating caps are fixed to the pistons and move together with them. An example of such a configuration is described with respect to and shown in FIG. 4, which shows a cross section of the new length optimized disconnector with insulating parts attached to the pistons, with a) the connected position, b) the disconnected position and c) the earthed position.

The new configuration fulfills the functionality of a three-position disconnector switch, but it can be also be considered as a parallel configuration of two two-position disconnector switches and used independently.

When used as a three-position disconnector switch, sequential movements of the piston 4a and 4b is provided, and the drives of each part linked to the motor driven threads 5a and 5b are aligned in a way that movements in the desired direction are allowed, and movement in the other direction is blocked in order to prevent for example direct earthing of the power incoming contact. The drives of the disconnectors can be motorized, electromagnetically driven or even manual, with proper interlocking of both moving parts. For example, the switch can be configured such that piston 4a of the upper part cannot move to earth position unless the piston 4b of lower part is in a disconnected position.

Even though a total width of the full new disconnector switch is increased over that of existing switches (when using described horizontal positioning of the two parts), the total length has decreased. Therefore, it is suitable in applications with small length requirements. In cases where total width is also of concern, the two parts of the described disconnector could be located above each other (vertical) or at least partly vertical.

Insulating cap 7 can move along with the piston 4a or can be fixed to the power incoming contact 3 or could be kept a certain distance in order to avoid dielectric issues, depending on the chosen material, its thickness and dielectric strength. Insulating cap 8 can move along with the piston 4b or can be fixed directly to the wall 6, since the wall is in contact with earth. Threaded rod 5b can be made of some insulating material, and properly assembled within the cap 8 in order to avoid gap and dielectric discharges penetrating along the threaded rod further to the drive. The rod 5b can for example be made of several parts, ensuring proper insulation and no gap within the cap 8.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A three-position disconnector switch, comprising:
    an earthing contact;
    a power out contact;
    a power in contact;
    a first piston; and
    a second piston,
    wherein in a connected switch position the first piston is configured to make an electrical connection with the power out contact and the second piston is configured to make an electrical connection with the power out contact and the power in contact, and wherein in the connected switch position a distance between a first end of the first piston and the power in contact is less than a distance between a second end of the first piston and the earthing contact,
    wherein in a disconnected switch position the first piston is configured to make an electrical connection with the power out contact and the second piston is configured to make an electrical connection with the power out contact, and
    wherein in an earthed switch position the first piston is configured to make an electrical connection with the earthing contact and with the power out contact and the second piston is configured to make an electrical connection with the power out contact.

2. The three-position disconnector switch according to claim 1, wherein in the connected switch position the three-position disconnector switch is configured such that the first piston does not make an electrical connection with the power in contact.

3. The three-position disconnector switch according to claim 1, wherein in the disconnected switch position the three-position disconnector switch is configured such that the first piston does not make an electrical connection with the power in contact.

4. The three-position disconnector switch according to claim 1, wherein in the disconnected switch position the three-position disconnector switch is configured such that the second piston does not make an electrical connection with the earthing contact.

5. The three-position disconnector switch according to claim 1, wherein in the earthed switch position the three-position disconnector switch is configured such that the second piston does not make an electrical connection with the earthing contact.

6. The three-position disconnector switch according to claim 1, wherein in the disconnected switch position a distance between the first end of the first piston and the power in contact is less than a distance between the second end of the first piston and the earthing contact.

7. The three-position disconnector switch according to claim 1, further comprising a first insulator part,
    wherein in the connected switch position and the disconnected switch position the first insulator part is located between the first end of the first piston and the power in contact.

8. The three-position disconnector switch according to claim 7, wherein in the connected switch position and the disconnected switch position the first end of the first piston is at least partially located within the first insulator part.

9. The three-position disconnector switch according to claim 7, wherein in the disconnected switch position a distance between a first end of the second piston and the power in contact is greater than a distance between a second end of the second piston and the earthing contact or a housing wall in electrical contact with the earthing contact.

10. The three-position disconnector switch according to claim 9, further comprising a second insulator part,
   wherein in the disconnected switch position and the earthed switch position the second insulator part is located between a second end of the second piston and the earthing contact or the housing wall in electrical contact with the earthing contact.

11. The three-position disconnector switch according to claim 10, wherein in the disconnected switch position and the earthed switch position the second end of the second piston is at least partially located within the second insulator part.

12. The three-position disconnector switch according to claim 9, wherein in the earthed switch position a distance between the first end of the second piston and the power in contact is greater than a distance between the second end of the second piston and the earthing contact or the housing wall in electrical contact with the earthing contact.

13. The three-position disconnector switch according to claim 1, wherein the first piston is configured to move along a first axis and the second piston is configured to move along a second axis, and
   wherein the first axis is parallel to the second axis and the first axis is spaced laterally to or at least partly above the second axis.

14. A low voltage or medium voltage switchgear or control gear, comprising:
   one or more three-position disconnector switches according to claim 1.

* * * * *